United States Patent
Juhas

(10) Patent No.: US 10,024,357 B1
(45) Date of Patent: Jul. 17, 2018

(54) FOLDABLE BICYCLE WITH CABLE DECOUPLING MECHANISM

(71) Applicant: GM GLOBAL TECHNOLOGY OPERATIONS LLC, Detroit, MI (US)

(72) Inventor: Martin Juhas, Ottawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/599,105

(22) Filed: May 18, 2017

(51) Int. Cl.
*F16C 1/22* (2006.01)
*B62K 15/00* (2006.01)
*F16C 1/12* (2006.01)

(52) U.S. Cl.
CPC .............. *F16C 1/12* (2013.01); *B62K 15/008* (2013.01); *F16C 1/22* (2013.01)

(58) Field of Classification Search
CPC ... B62M 25/04; F16C 1/12; F16C 1/22; F16C 1/223; B62K 15/006; B62K 15/008; B62K 2015/001
See application file for complete search history.

(56) References Cited

U.S. PATENT DOCUMENTS

| | | | |
|---|---|---|---|
| 6,893,036 B2 * | 5/2005 | Groendal | B62K 19/00 280/275 |
| 6,986,522 B2 * | 1/2006 | Sinclair | B62K 15/006 280/278 |
| 7,159,884 B2 * | 1/2007 | Gu | B62K 15/006 280/278 |
| 9,248,881 B2 * | 2/2016 | Timonen | E05D 11/1007 |
| 2010/0212978 A1 * | 8/2010 | Huang | B62K 15/008 180/65.31 |

FOREIGN PATENT DOCUMENTS

| | | | | |
|---|---|---|---|---|
| DE | 102009053347 A1 * | 5/2011 | ............. | B62K 15/00 |
| WO | WO-2011026459 A1 * | 3/2011 | ............. | B62K 15/00 |

OTHER PUBLICATIONS

Machine translation of DE 102009053347 A1 obtained on Mar. 29, 2018.*
Machine translation of WO 2011026459 A1 obtained on Mar. 29, 2018.*

* cited by examiner

*Primary Examiner* — Adam D Rogers
(74) *Attorney, Agent, or Firm* — Lorenz & Kopf, LLP

(57) ABSTRACT

A cable decoupling mechanism is provided for a bicycle having an unfolded state and a folded state. The cable decoupling mechanism includes a housing; a shifter pulley arranged at least partially within the housing and configured to receive a shifter cable coupled to a shifter of the bicycle; and a gear pulley arranged at least partially within the housing and configured to receive a gear cable coupled to a gear mechanism of the bicycle. The shifter pulley and the gear pulley are mechanically engaged together in the unfolded state such that the shifter cable is mechanically coupled with the gear cable for mutual actuation, and the shifter pulley and the gear pulley are mechanically disengaged from one another in the folded state such that the shifter cable and the gear cable are mechanically decoupled for independent movement.

20 Claims, 6 Drawing Sheets

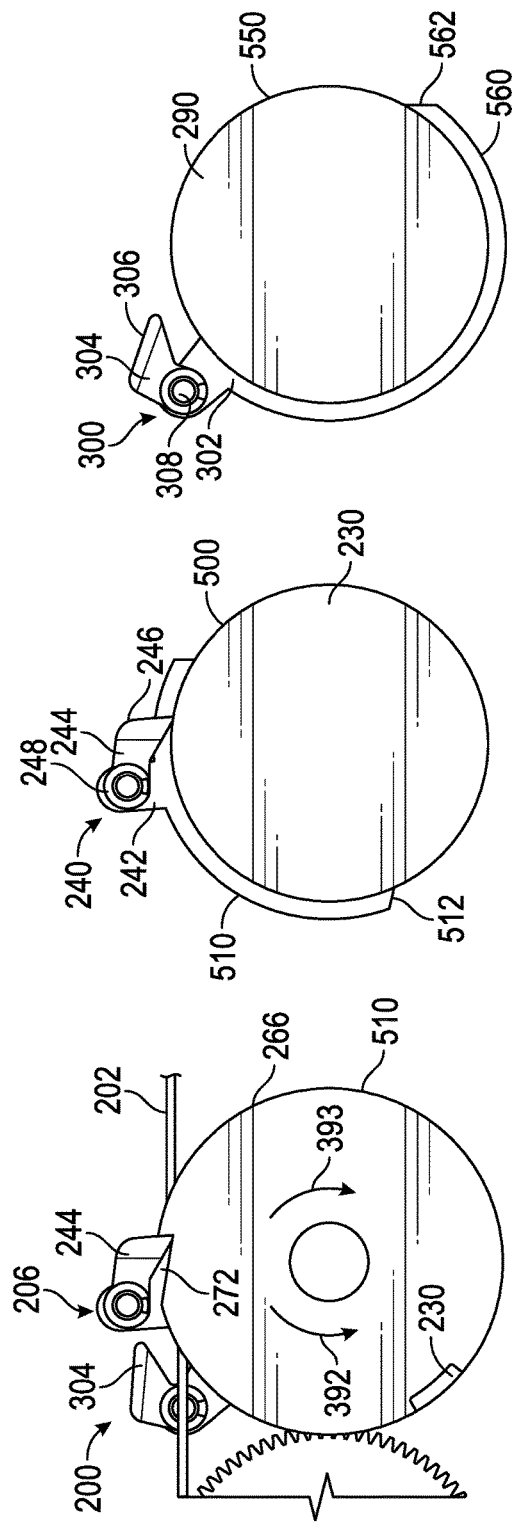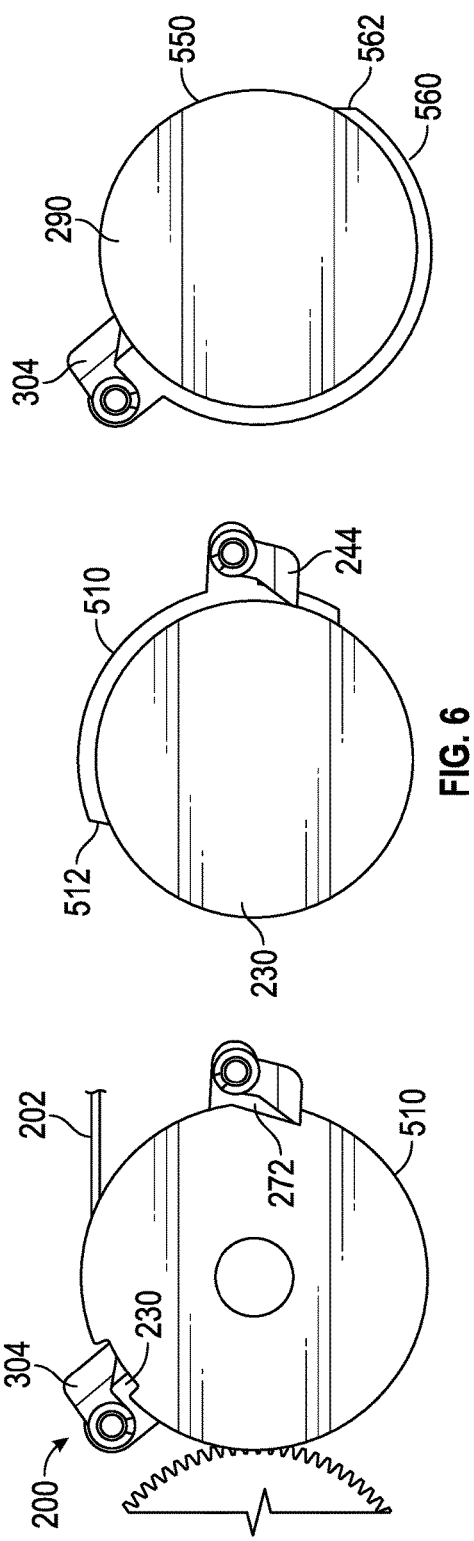
FIG. 5
FIG. 6

FOLDABLE BICYCLE WITH CABLE DECOUPLING MECHANISM

TECHNICAL FIELD

The present invention generally relates to bicycles, and more particularly relates to foldable bicycles.

BACKGROUND OF THE INVENTION

Bicycles, especially electric bicycles, are increasing in popularity for both commuting and sport. However, the size and shape of bicycles may create issues with respect to storage and transport. Foldable bicycles that enable a reduction in the overall size have been introduced. However, conventional foldable bicycles may have issues with complexity and/or durability, particularly with respect to the cable arrangements in geared bicycles that may be displaced or jostled during the transport and/or the folding and unfolding processes. For example, conventional foldable bicycles may be difficult to roll or dolly in the folded state because movement of the wheels tends to drive the pedals, which may undesirably contact the frame, wheels, and the surroundings.

Accordingly, it is desirable to provide improved foldable bicycles that overcome problematic issues associated with conventional bicycles. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, a cable decoupling mechanism is provided for a bicycle having an unfolded state and a folded state. The cable decoupling mechanism includes a housing; a shifter pulley arranged at least partially within the housing and configured to receive a shifter cable coupled to a shifter of the bicycle; and a gear pulley arranged at least partially within the housing and configured to receive a gear cable coupled to a gear mechanism of the bicycle. The shifter pulley and the gear pulley are mechanically engaged together in the unfolded state such that the shifter cable is mechanically coupled with the gear cable for mutual actuation, and the shifter pulley and the gear pulley are mechanically disengaged from one another in the folded state such that the shifter cable and the gear cable are mechanically decoupled for independent movement.

In accordance with another exemplary embodiment, the gear pulley may have an outer periphery with a first detent, and the shifter pulley may include a shifter pawl mounted on a pawl flange, the shifter pawl being pivotable between a first engaged position and a first disengaged position. In the unfolded state, the shifter pawl is in the first engaged position within the first detent to interlock the shifter pulley and the gear pulley, and in the folded state, the shifter pawl is in the first disengaged position outside of the first detent such that the shifter pulley is rotatable independently from the gear pulley.

In accordance with another exemplary embodiment, the outer periphery of the gear pulley may have a second detent, and the cable decoupling mechanism further includes a retention pawl being pivotable between a second engaged position and a second disengaged position. In the folded state, the retention pawl is in the second engaged position within the second detent to prevent rotation of the gear pulley in at least a first rotational direction, and in the unfolded state, the retention pawl is in the second disengaged position outside of the second detent to enable rotation of the gear pulley In accordance with another exemplary embodiment, the cable decoupling mechanism further includes a stationary plate arranged in between the shifter pulley and the gear pulley, the stationary plate including a flange supporting the retention pawl.

In accordance with another exemplary embodiment, the stationary plate may include a first cam surface that is configured to place the shifter pawl from the first engaged position into the first disengaged position as the shifter pulley rotates in the first rotational direction.

In accordance with another exemplary embodiment, the stationary plate may include a first base surface that is configured to place the shifter pawl from the first disengaged position into the first engaged position as the shifter pulley rotates in a second rotational direction.

In accordance with another exemplary embodiment, the shifter pulley may include a second cam surface and a second base surface, and the retention pawl is configured to follow the second cam surface in the second disengaged position and to follow the second base surface in the second engaged position such that rotation of the shifter pulley is configured to adjust the retention pawl between the second engaged position and the second disengaged position.

In accordance with another exemplary embodiment, the cable decoupling mechanism may further include a tension assembly coupled to the shifter pulley to bias the shifter pulley in a second rotational direction In accordance with another exemplary embodiment, the tension assembly may include a first gearwheel rotationally coupled to the shifter pulley, a second gearwheel rotationally coupled to the first gearwheel, and a tension spring rotationally coupled to the second gearwheel such that tension of the shifter cable drives the shifter pulley in the first rotational direction, the first gearwheel in the first rotational direction, the second gearwheel in the second rotational direction, and the tension spring in the second rotational direction.

In accordance with another exemplary embodiment, the cable decoupling mechanism further includes a stationary plate arranged in between the shifter pulley and the gear pulley. The stationary plate includes a retention pawl being pivotable between a retention pawl engaged position and a retention pawl disengaged position, and the stationary plate further includes a stationary plate outer periphery defined by at least a stationary plate cam surface and a stationary plate base surface. The gear pulley may have a gear pulley outer periphery defined by at least a first detent, a second detent, and a gear pulley base surface. The shifter pulley may include a shifter pawl mounted on a pawl flange and being pivotable between a shifter pawl engaged position and a shifter pawl disengaged position. The shifter pulley includes a shifter pulley outer periphery defined by at least a shifter pulley cam surface and a shifter pulley base surface. In the unfolded state, the shifter pawl is in the shifter pawl engaged position within the second detent of the gear pulley at an angular position proximate to the stationary plate base surface, and in the unfolded state, the retention pawl is in the shifter pawl disengaged position outside of the first detent of the gear pulley at an angular position proximate to the shifter pulley cam surface. In a first transition from the unfolded state to the folded state, a first tension force on the shifter cable pulls the shifter pulley and the gear pulley in a first rotational direction relative to the stationary plate until the shifter pawl encounters the stationary plate cam surface to place the shifter pawl into the shifter pawl disengaged position, thereby decoupling the shifter pulley from the gear pulley, and the retention pawl encounters the shifter pulley base surface to place the retention pawl into the retention pawl engaged position, thereby retaining the gear pulley.

In accordance with another exemplary embodiment, in the folded state, the shifter pawl is in the shifter pawl disengaged position outside of the second detent of the gear pulley at an angular position proximate to the stationary plate cam surface, and in the folded state, the retention pawl is in the shifter pawl engaged position within of the first detent of the gear pulley at an angular position proximate to the shifter pulley base surface. In a second transition from the folded state to the unfolded state, a release of the first tension force on the shifter cable enables a tension assembly to pull the shifter pulley in a second rotational direction relative to the stationary plate until the shifter pawl encounters the stationary plate base surface to place the shifter pawl into the shifter pawl engaged position, thereby coupling the shifter pulley and the gear pulley, and the retention pawl encounters the shifter pulley cam surface to place the retention pawl into the retention pawl disengaged position, thereby releasing the gear pulley.

In accordance with another exemplary embodiment, a bicycle may include a foldable frame having a folded state and an unfolded state and at least one hollow portion; at least a front wheel and a back wheel coupled to the foldable frame; a gear assembly coupled to the back wheel; a shifter configured to receive an input associated with the gear assembly; a cable decoupling mechanism positioned within the at least one hollow portion of the foldable frame; and a cable assembly extending through the at least one hollow portion of the foldable frame and between the shifter and the gear assembly. The cable assembly includes an input cable extending between the input device and the cable decoupling mechanism and a gear cable extending between the cable decoupling mechanism and the gear assembly. The cable decoupling mechanism is configured to couple the shifter cable and the gear cable together in the unfolded state and to decouple the shifter cable and the gear cable from one another in the folded state.

In accordance with another exemplary embodiment, the cable decoupling mechanism includes a housing; a shifter pulley arranged at least partially within the housing and configured to receive the shifter cable; and a gear pulley arranged at least partially within the housing and configured to receive the gear cable. The shifter pulley and the gear pulley are mechanically engaged together in the unfolded state such that the shifter cable is coupled with the gear cable for mutual actuation. The shifter pulley and the gear pulley are mechanically disengaged from one another in the folded state such that the shifter cable and the gear cable are decoupled for independent movement In accordance with another exemplary embodiment, the gear pulley may have an outer periphery with a first detent, and the shifter pulley may include a shifter pawl mounted on a pawl flange and pivotable between a first engaged position and a first disengaged position. In the unfolded state, the shifter pawl is in the first engaged position within the first detent to interlock the shifter pulley and the gear pulley, and in the folded state, the shifter pawl is in the first disengaged position outside of the first detent such that the shifter pulley is rotatable independently from the gear pulley.

In accordance with another exemplary embodiment, the outer periphery of the gear pulley may have a second detent, and the cable decoupling mechanism may further include a retention pawl being pivotable between a second engaged position and a second disengaged position. In the folded state, the retention pawl is in the second engaged position within the second detent to prevent rotation of the gear pulley in at least a first rotational direction, and in the unfolded state, the retention pawl is in the second disengaged position outside of the second detent to enable rotation of the gear pulley.

In accordance with another exemplary embodiment, the cable decoupling mechanism may further include a stationary plate arranged in between the shifter pulley and the gear pulley with a flange supporting the retention pawl.

In accordance with another exemplary embodiment, the stationary plate may include a first cam surface that is configured to place the shifter pawl from the first engaged position into the first disengaged position as the shifter pulley rotates in a first rotational direction.

In accordance with another exemplary embodiment, the stationary plate may include a first base surface that is configured to place the shifter pawl from the first disengaged position into the first engaged position as the shifter pulley rotates in a second rotational direction.

In accordance with another exemplary embodiment, wherein the shifter pulley may include a second cam surface and a second base surface, and the retention pawl may configured to follow the second cam surface in the second disengaged position and to follow the second base surface in the second engaged position such that rotation of the shifter pulley is configured to adjust the retention pawl between the second engaged position and the second disengaged position.

In accordance with another exemplary embodiment, the cable decoupling mechanism may further include a tension assembly coupled to the shifter pulley to bias the shifter pulley in the second rotational direction. The tension assembly includes a first gearwheel rotationally coupled to the shifter pulley, a second gearwheel rotationally coupled to the first gearwheel, and a tension spring rotationally coupled to the second gearwheel such that tension of the shifter cable drives the shifter pulley in the first rotational direction, the first gearwheel in the first rotational direction, the second gearwheel in the second rotational direction, and the tension spring in the second rotational direction.

BRIEF DESCRIPTION OF THE DRAWINGS

The present invention will hereinafter be described in conjunction with the following drawing figures, wherein like numerals denote like elements.

FIGS. 5-7 are side views of portions of the cable decoupling mechanism of FIG. 3 in an unfolded state, a transition state, and a folded state in accordance with an exemplary embodiment;

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
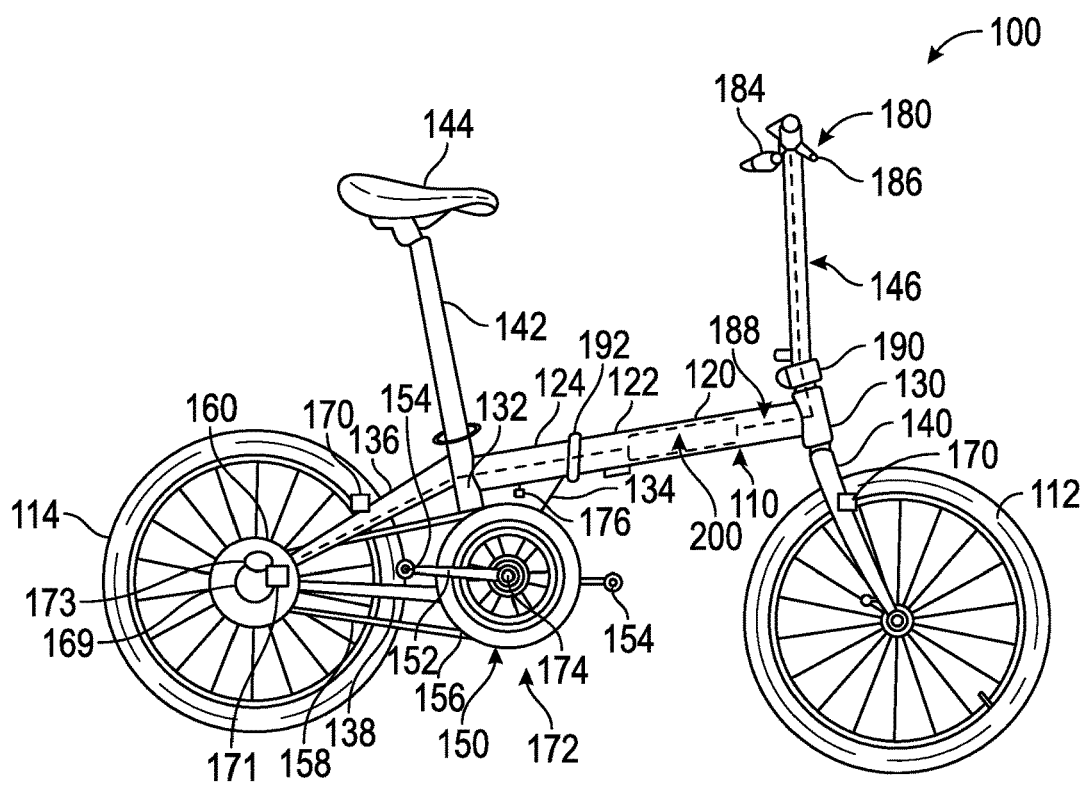
FIG. 1 is a schematic diagram of a bicycle with a cable decoupling mechanism in an unfolded state in accordance with an exemplary embodiment.

FIG. 1 is a schematic diagram of a bicycle 100 with a cable decoupling mechanism 200 in accordance with an exemplary embodiment. Generally, the bicycle 100 may be any type of foldable bicycle. In one embodiment, the bicycle 100 is an electric bicycle. However, exemplary embodiments are also applicable to non-electric bicycles, e.g. non-assisted or completely human-powered bicycles, or combinations thereof.

One exemplary embodiment of the bicycle 100 will be introduced below prior to a more detailed description of the cable decoupling mechanism 200. It should be appreciated that the overall architecture, setup, and operation, as well as the individual components, of the illustrated bicycle 100 are merely exemplary and that differently configured arrangements may also be utilized to implement the examples disclosed herein. Additionally, although depicted in FIG. 1 as being two-wheeled, exemplary embodiments discussed herein are applicable to any type of bicycle, including tricycles and four-wheel cycles.

In the depicted example, the bicycle 100 includes a frame 110 that supports a rider or operator (not shown) and various control and operational components. Generally, the frame 110 may be considered to include a top tube 120, a head tube 130, a seat tube 132, a down tube 134, a seat stay 136, a chain stay 138, and a front fork 140.

The top tube 120 extends between the head tube 130 and the seat tube 132. A seat post 142 and saddle 144 are supported by the seat tube 132 for accommodating the operator. The front fork 140 extends from the head tube 130 and secures a front wheel 112. A handlebar assembly 146 extends from the head tube 130 and is operatively coupled to the front fork 140 such that the operator may steer the bicycle 100 with the handlebar assembly 146. The seat stay 136 and the chain stay 138 extend from the down tube 134 and secure the rear wheel 114. As described below, portions of the frame 110 and other bicycle components may be hollow to accommodate internal wires and/or cables.

A drive mechanism 150 may include crank arms 152 with first ends attached to pedals 154 and second ends coupled to a front chain ring 156. The front chain ring 156 engages a chain 158, and the chain 158 further engages a rear hub assembly 160 at the rear wheel 114. As a result, force at the pedals 154 from the operator is transferred to the rear wheel 114 via the drive mechanism 150 for propulsion of the bicycle 100. In this context, the "chain" may refer to any force transfer element, including a linked chain and/or a belt.

A braking system 170 is provided to stop or slow the motion of the bicycle 100 based on inputs from the rider. In one example, the braking system 170 is positioned on one or both wheels 112, 114. However, in other embodiments, the braking system 170 is configured to slow or stop the motion of the bicycle 100 at other portions of the drive mechanism 150.

The bicycle 100 further includes a gearing mechanism 172 constructed and arranged to provide for at least one of gearing ratios, locking arrangements, and/or free rotation arrangements between elements of the drive mechanism 150 (e.g., at the pedals 154, wheels 112, 114, and/or motor 174), described in greater detail below. In one embodiment, the gearing mechanism 172 includes the rear hub assembly 160, which may include chain rings or sprockets of different sizes and mechanical actuators for selecting the different sizes based on input from the operator and/or control system (e.g., control system 180, described below) to provide different gearing ratios of input to output to facilitate riding at different speeds, terrain, and/or difficulty. In one example, the rear hub assembly 160 includes a cassette of chain rings 169 representing different "gears." In such an example, the rear hub assembly 160 may further include an adjustment mechanism 171 (e.g., a derailleur or internal mechanical adjustment actuator) and spring assembly 173 to guide the chain 158 up and down the chain rings 169 into the selected gears. In some examples, the rear hub assembly 160 may have a housing and be considered a gearbox. In particular, the rear hub assembly 160 may be an internally geared hub assembly. Additional details about the rear hub assembly 160. the gearing mechanism 172, and the changing of gears are provided below.

In one embodiment, the bicycle 100 may include an electric motor (or motor/generator) 174 that may be used to propel the bicycle 100 forward and/or to generate electricity from motor braking. The motor 174 may be attached to the bicycle 100 in any suitable position or arrangement. The motor 174 may include any type of motor or motor/generator, such as a permanent magnet AC machine. Additionally, the motor 174 may be powered by one or more battery assemblies 176.

Generally, control system 180 may be provided to control and/or facilitate operation of the bicycle 100, including operation of the motor 174, gearing mechanism 172, and/or braking system 170. In some embodiments, the control system 180 may include one or more electronic processing units to receive input signals and to send out signals to control various aspects of the bicycle 100. In a number of variations, the electronic processing unit may include processing elements, memory, and/or communication components. The bicycle 100 may further include any number of sensors or sensor assemblies.

The control system 180 may further include one or more input devices or elements 184, 186 to accept input from the operator. The control system 180 may also include one or more cable assemblies 188 (one of which is schematically shown) extending between the input devices 184, 186 and the respective bicycle component to be actuated. Any suitable force or input transfer elements or connectors may be provided as part of the cable assembly 188. For example, the cable assembly 188 includes one or more cables that extend through portions of the bicycle 100, as discussed in greater detail below. In this manner, the input devices 184, 186 and cable assembly 188, as well as any intervening or additional components, enable commands and/or other signals to be communicated within the bicycle 100 to control and facilitate operation of the bicycle 100.

In one embodiment, the input devices 184, 186 include a gear shifter 184 coupled to the rear hub assembly 160 via cable assembly 188. Generally, the term "shifter" refers to any type of input device, including levers, buttons, dials, switches, and the like, both mechanical and/or electronic. As such, during operation, an input at the shifter 184 is transmitted via cable assembly 188 to result in actuation of the gearing mechanism 172, e.g., actuation of the rear hub assembly 160. In further embodiments, the input devices 184, 186 may include a brake lever 186 coupled to the braking system 170 via cable assembly (not shown in FIG. 1). Accordingly, during operation, an input at the brake lever 186 is transmitted via cable assembly to result in actuation of the braking system 170. In some embodiments, one or more power cables (not shown in FIG. 1) may be provided to provide power from the battery assembly 176 to other elements of the bicycle 100.

As introduced above, the gearing mechanism 172 may include or otherwise cooperate with the shifter 184, cable assembly 188, and rear hub assembly 160 to modify and/or maintain a selected gear. For example, to change gears, the operator actuates the shifter 184, which increases or releases tension in the cable assembly 188. During normal operation, the cable assembly 188 transfers this increase or release of tension to the rear hub assembly 160. Typically, an increase in tension at the rear hub assembly 160 functions to pull the adjustment mechanism 171 and the chain 158 in a particular transverse direction to change the gear, and upon release of tension at the rear hub assembly 160, the spring assembly 173 pulls the adjustment mechanism 171 and the chain 158 in the opposite transverse direction. As noted above, the rear hub assembly 160 may be an internally geared hub assembly that receives input from the cable assembly 188 to change gears to enable selected force transfer from the chain 158 to the wheel 114. For example, the adjustment mechanism 171 of the rear hub assembly 160 may be pulled and released by the cable assembly 188 to appropriately change the gears. In one example continued below, the rear hub assembly 160 may provide a plurality of drive gears (e.g., five) and a neutral gear in which the adjustment mechanism 171 is placed in a position that functions to decouple the chain 158 from the hub of the rear wheel 114. As such, in the neutral gear, movement of the chain 158 (and the coupled crank arms 152 and pedals 154) does not drive the rear wheel 114, and similarly, movement of the rear wheel 114 does not drive the chain 158 (and the coupled crank arms 152 and pedals 154). In other words, in the neutral gear, the bicycle 100 may be pushed without spinning the crank arms 152 and pedals 154. In one exemplary embodiment, tension on the adjustment mechanism 171 may generally result in a decrease in gearing until the neutral gear, e.g., a fifth gear is the result of the least amount of tension and as tension is increased, the gears cycle through the fourth gear, third gear, second gear, first gear, and finally, the neutral gear. Other gearing mechanisms and arrangements may be provided.

As also introduced above, the bicycle 100 is a foldable bicycle. In other words, the bicycle 100 may be considered to have an unfolded state that is suitable for operation and a folded state that is suitable for storage or transport. As the bicycle 100 is being folded or unfolded, the bicycle 100 may be considered to have one or more transition states, as discussed in greater below.

In this exemplary embodiment, the bicycle 100 includes hinges 190, 192 to facilitate folding and unfolding. For example, a hinge 190 may be provided on or proximate to the head tube 130. The hinges 190, 192 may include levers that enable the respective hinge 190, 192 to be unlocked to enable movement and locked to prevent movement. As such, to place the bicycle 100 from the unfolded state to the folded state, the hinge 190 may be unlocked to enable all or portions of the handlebar assembly 146 to be pivoted about a generally horizontal axis. In other words, the handlebar assembly 146 may be pivoted about the hinge 190 towards the top tube 120 or front fork 140, thereby resulting in a more compact arrangement of the bicycle 100.

Hinge 192 may be provided on the top tube 120. As a result, the top tube 120 may be considered to include a front tube portion 122 and a rear tube portion 124 joined together at the hinge 192. As above, hinge 192 may include a lever that enables the hinge to be unlocked and locked. As such, to place the bicycle 100 in the folded state, the hinge 192 may be unlocked to enable the top tube 120 to be "folded" at the hinge 192. In effect, the front tube portion 122 (and the components of the bicycle 100 attached to the front tube portion 122) and the rear tube portion 124 (and the components of the bicycle 100 attached to the rear tube portion 124) are pivoted towards one another about a generally horizontal (or vertical) axis, thereby resulting in a more compact arrangement of the bicycle 100.

Figure 2:
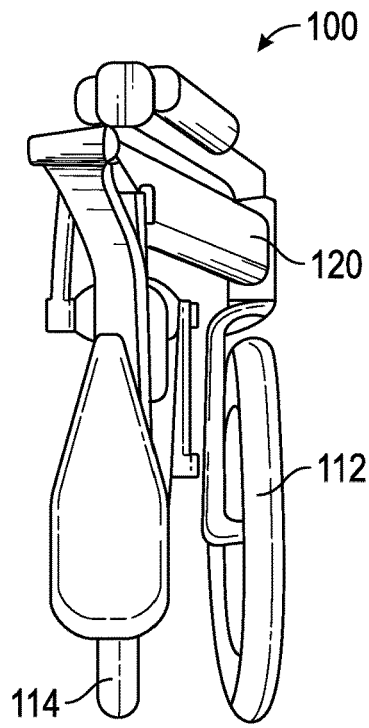
FIG. 2 is a schematic diagram of the bicycle of FIG. 1 in a folded state in accordance with an exemplary embodiment.

As noted above, FIG. 1 depicts the bicycle 100 in the unfolded state. Reference is briefly made to FIG. 2, which depicts the bicycle 100 in the folded state. Generally, other hinge locations for folding and unfolding the bicycle 100 may be provided, and one or more of the hinges 190, 192 described above may be omitted.

As also introduced above, the cable assemblies, particularly cable assembly 188, may extend through hollowed portions of the frame 110. For example, in FIG. 1, cable assembly 188 is depicted extending from the shifter 184, through the handlebar assembly 146, through the head tube 130, through the top tube 120 (and hinge 192), and through one or more of the seat stays 136 to the rear hub assembly 160. When the bicycle 100 being folded or unfolded, the path for the cable assembly 188 may undergo changes in tension, which if unaddressed, may inadvertently actuate the shifter 184 and/or rear hub assembly 160. However, the cable decoupling mechanism 200 is provided to decouple portions of the cable assembly 188 as the bicycle 100 is folded and re-couple portions of the cable assembly 188 as the bicycle 100 is unfolded. In the depicted embodiment, the cable decoupling mechanism 200 is arranged within the top tube 120, forward of the hinge 192, although in other embodiments, the cable decoupling mechanism 200 may be arranged in other locations.

Figure 3:
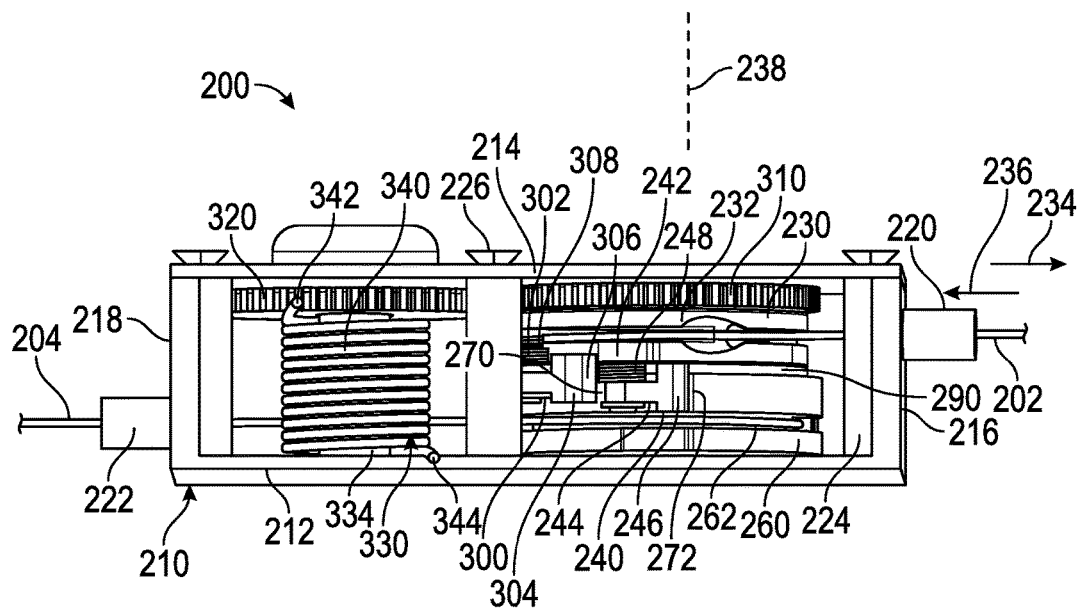
FIG. 3 is a plan view of a cable decoupling mechanism that may be implemented in the bicycle of FIG. 1 in accordance with an exemplary embodiment.

FIG. 3 is a plan view of the cable decoupling mechanism 200 that may be implemented in the bicycle 100 of FIG. 1 in accordance with an exemplary embodiment. As introduced above, the cable decoupling mechanism 200 is configured to mechanically couple and decouple portions of the cable assembly 188, which in this embodiment, includes a shifter (or input) cable 202 and a gear cable 204. In particular, the cable decoupling mechanism 200 is configured to mechanically couple and decouple the shifter cable 202 that extends from the cable decoupling mechanism 200 to one or more of the shifters 184 and the gear cable 204 that extends from the cable decoupling mechanism 200 to the rear hub assembly 160. In one example, the view of the cable decoupling mechanism 200 of FIG. 3 may be considered a top view, although in other examples, it may be considered a side or bottom view. The orientation of the cable decoupling mechanism 200 is generally only relevant with respect to the shifter cable 202 and the gear cable 204.

Figure 4:
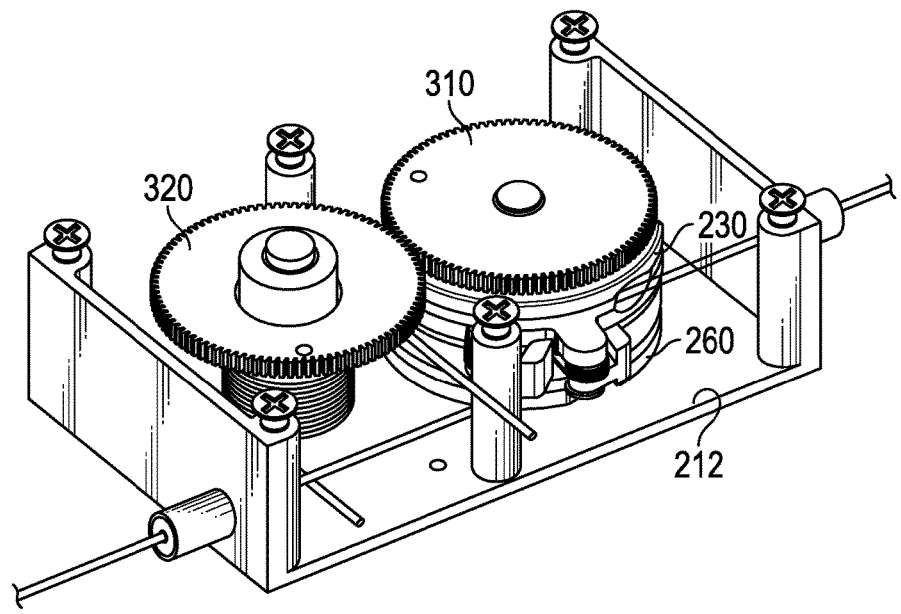
FIG. 4 is an isometric view of the cable decoupling mechanism of FIG. 3 with a side wall removed in accordance with an exemplary embodiment.

As shown in FIG. 3, the cable decoupling mechanism 200 may include a housing 210 formed by one or more side walls 212, 214 and one or more end walls 216, 218. The end walls 216, 218 may include cable guides 220, 222 through which the respective shifter cable 202 and gear cable 204 extend. The side walls 212, 214 may be coupled together with one or more stand-offs or spacers 224 and fasteners 226 that accommodate the other portions of the cable decoupling mechanism 200. Reference is additionally made to FIG. 4, which is an isometric view of the cable decoupling mechanism 200 with wall 212 removed to depict another view.

As used herein, the term "coupled" (or mechanically linked) is used with respect to the shifter cable 202, gear cable 204, and overall cable assembly 188 to refer to a state of mutual or collective movement or actuation. In other words, when the shifter cable 202 is coupled to the gear cable 204, movement of the shifter cable 202 results in movement of the gear cable 204. Conversely, the term "decoupled" (or mechanically unlinked) is used with respect to the shifter cable 202, gear cable 204, and overall cable assembly 188 to refer to a state of independent movement or actuation. In other words, when the shifter cable 202 is decoupled from the gear cable 204, movement of the shifter cable 202 does not result in movement of the gear cable 204.

The cable decoupling mechanism 200 includes a shifter pulley 230 attached to the shifter cable 202 and a gear pulley 260 attached to the gear cable 204. Generally, the pulleys 230, 260 are wheel- or disc-shaped and at least partially pivot or otherwise rotate with movement of the respective cable 202, 204, as will be discussed in greater detail below.

The shifter pulley 230 includes a groove 232 into which the shifter cable 202 is inserted to at least partially wrap around the shifter pulley 230 to retain the shifter cable 202. For example, the end of the shifter cable 202 has an enlarged portion pressed within the groove 232 to secure the shifter cable 202 to the shifter pulley 230. The shifter pulley 230 is generally configured to pivot about a pulley axis 238 generally orthogonal to the direction of the shifter cable 202. As the shifter cable 202 is pulled or tensioned in a first direction 234, the shifter pulley 230 is rotated in a first rotational direction (e.g., clockwise in FIG. 4). Such tension in the first direction 234 may occur, for example, when the shifter 184 is actuated or when the bicycle 100 is being folded, as discussed in greater detail below. As the tension is released in a second direction 236, the shifter pulley 230 is rotated in a second rotational direction (e.g., counter-clockwise in FIG. 4).

The shifter pulley 230 further includes a shifter pawl assembly 240 with a shifter pawl flange 242 on which a shifter pawl 244 is mounted. The shifter pawl 244 has an end 246 that pivots "up" and "down" to between a disengaged position and an engaged position, respectively, relative to cooperating elements on the gear pulley 260, as discussed below. The shifter pawl assembly 240 further includes a spring element 248 to bias the shifter pawl 244 into the engaged position.

The gear pulley 260 includes a groove 262 into which the gear cable 204 is inserted to at least partially wrap around the gear pulley 260 to retain the gear cable 204. For example, the end of the gear cable 204 has an enlarged portion pressed within the groove 262 to secure the gear cable 204 to the gear pulley 260. The gear pulley 260 is generally configured to pivot about the same axis 238 as the shifter pulley 230. As the gear pulley 260 rotates in the first rotational direction (e.g., clockwise in FIG. 4), tension is applied to the gear cable 204, which is transferred to the rear hub assembly 160 to adjust the gear. As tension is applied to the gear cable 204 in the opposite direction, such as from the spring assembly 173 of the rear hub assembly 160, the gear pulley 260 rotates in the second rotational direction.

A stationary plate 290 is interposed between the shifter pulley 230 and the gear pulley 260. The stationary plate 290 is generally disc shaped and does not pivot. The stationary plate 290 includes a retention pawl assembly 300 with a flange 302 and a retention pawl 304 mounted on the flange 302. The retention pawl 304 has an end 306 that pivots "up" and "down" to between a disengaged position and an engaged position, respectively, relative to cooperating elements of the gear pulley 260, as discussed below. The retention pawl assembly 300 further includes a spring element 308 to bias the retention pawl 304 into the engaged position.

As described in greater detail below, the gear pulley 260 has an outer periphery with one or more detents 270, 272 that facilitate control of the gear pulley 260. In particular, the retention detent 270 may be engaged with the retention pawl 304 of the stationary plate 290 to prevent rotation of the of the gear pulley 260 in the second rotational direction (e.g., counter-clockwise in FIG. 4). Further, the shifter detent 272 may be engaged with the shifter pawl 244 of the shifter pulley 230 to "lock" the gear pulley 260 in mutual rotation with the shifter pulley 230, particularly in the first rotational direction (e.g., clockwise in FIG. 4). Further details about the operation will be provided below.

A first gearwheel 310 is coupled to the shifter pulley 230 and rotates with the shifter pulley 230. The first gearwheel 310 engages a second gearwheel 320 to rotate together in opposite rotational directions. The second gearwheel 320 is coupled to a tension assembly 330. The tension assembly 330 may include a tension spring 340 arranged on an axle or pin 334 extending from the housing wall 212 through the tension spring 340. The tension spring 340 has a first end 342 attached to the second gearwheel 320 and a second end 344 attached or otherwise biased against a stationary portion of the housing 210, such as one of the stand-offs 224.

As a result of the arrangement of the tension assembly 330, tension applied to the shifter cable 202 drives the shifter pulley 230 and the first gearwheel 310 to pivot in the first rotational direction, which drives the second gearwheel 320 in the second rotational direction. As the second gearwheel 320 pivots in the second rotational direction, the tension spring 340 is tightened to result in an opposing tension force. This opposing tension force may be used to return the shifter pulley 230 to a previous position, as is discussed in greater detail below.

Figure 7:
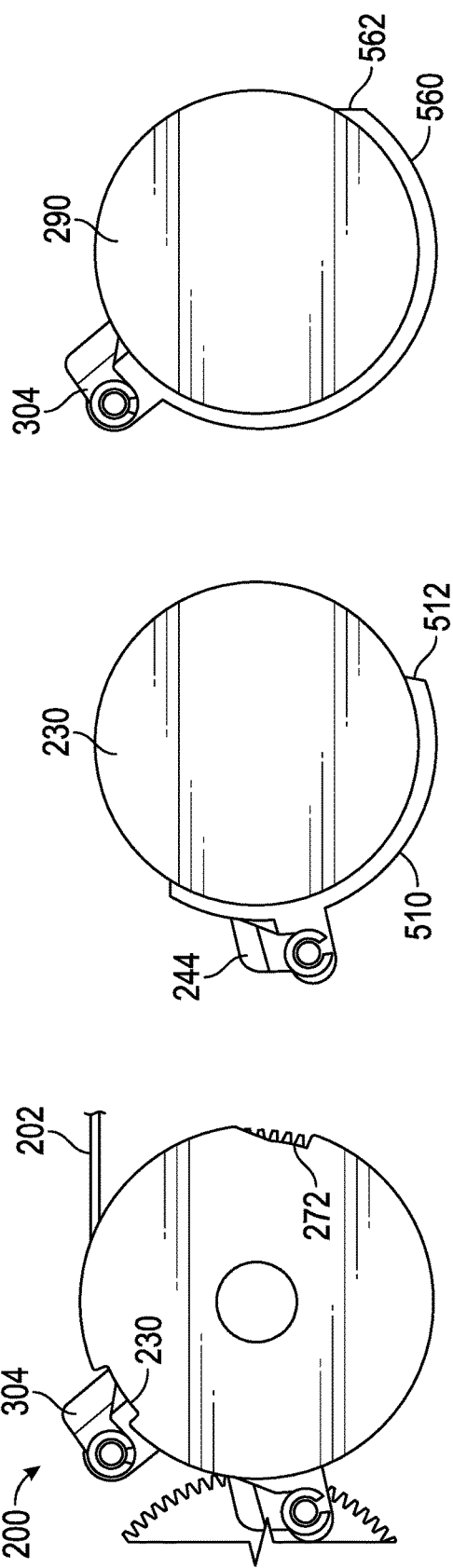

Reference is made to FIGS. 5-7, which are various views of the cable decoupling mechanism 200 in the unfolded (or coupled) state, a transition state, and the folded (or decoupled) state, respectively. In particular, FIGS. 5-7 depict the shifter pulley 270 and stationary plate 290 in isolation from other portions of the cable decoupling mechanism 200. FIGS. 5-7 additionally depict a side view of the gear pulley 260 interacting with the shifter pawl 244 on the shifter pulley 230 and the retention pawl 304 on the stationary plate 290. The isolated views of the shifter pulley 230 and stationary plate 290 are depicted in the rotational position corresponding to the respective collective view with the gear pulley 260 for each of FIGS. 5-7.

As shown in FIGS. 5-7, the outer periphery of the gear pulley 260 includes a base surface 500 and a cam surface 510 extending from the base surface 500 (e.g., the cam surface 510 is at a greater radius from the center than the base surface 500). In this embodiment, the cam surface 510 extends from an angular position adjacent the shifter pawl 244 at transition surface 512 on an end of the cam surface 510 opposite the shifter pawl 244. As described below, the base and cam surfaces 500, 510 on the gear pulley 260 function to actuate or reposition the retention pawl 304.

The stationary plate 290 also has an outer periphery that includes a base surface 550 and a cam surface 560 extending from the base surface 550 at transition surface 562. As described below, the base and cam surfaces 550, 560 on the stationary plate 290 function to actuate or reposition the shifter pawl 244.

As introduced above, the gear pulley 260 has detents 270, 272 formed in a base surface 570 of the outer periphery to interact with the pawls 244, 304 during rotation of the various components of the cable decoupling mechanism 200. The first rotational direction 590 and the second rotational direction 592 of the shifter pulley 230 and the gear pulley 260 are labeled in FIGS. 5-7 for reference.

Now that the components have been introduced, operation of the cable decoupling mechanism 200 will now be described. As introduced above, the bicycle 100 may be considered to have an unfolded state, a folded state, and one or more transition states between the unfolded and folded states.

In the unfolded state, the shifter cable 202 and the gear cable 204 are "coupled" or "mechanically linked" together for mutual movement or actuation. As such, during normal operation, input from operation at the shifter 184 actuates the shifter cable 202, which in turn, actuates the gear cable 204, and actuation of the gear cable 204 results in actuation of the rear hub assembly 160, e.g. for example to shift gears. In the folded state, the shifter cable 202 and the gear cable 204 are "decoupled" or "mechanically unlinked" for independent movement. For example, in this state, movement of the shifter cable 202 resulting from input at the shifter 184 or as a result of pulling on the shifter cable 202 during the folding process does not result in any movement of the gear cable 204.

Figure 8:
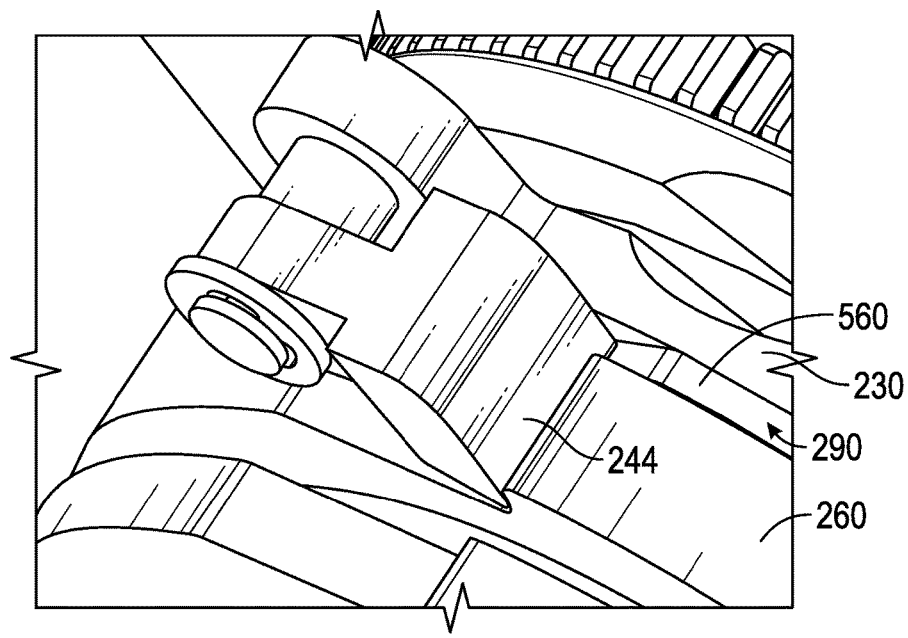
FIG. 8 is a partial, more detailed top view of the cable decoupling mechanism of FIG. 3 in the unfolded state in accordance with an exemplary embodiment.
Figure 9:
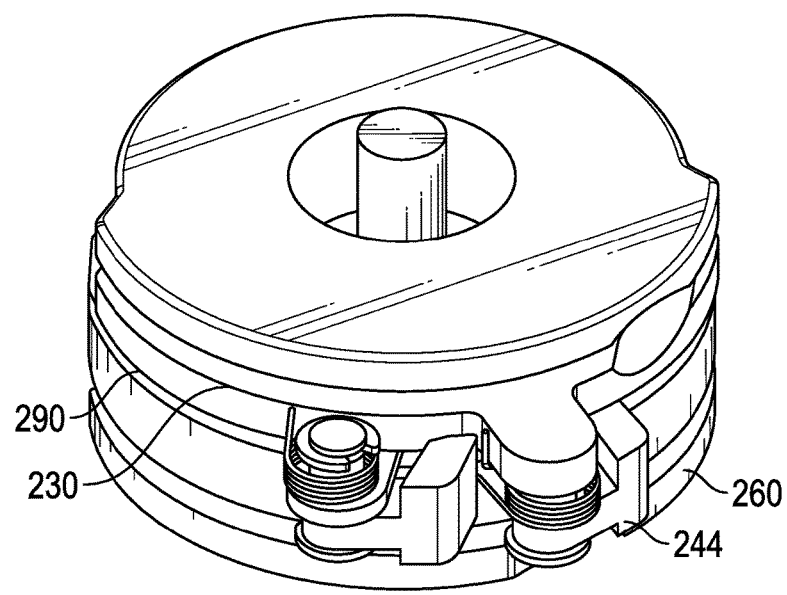
FIG. 9 is a partial, isometric view of the cable decoupling mechanism of FIG. 3 in the unfolded state in accordance with an exemplary embodiment.

FIG. 5 is a view of the components of the cable decoupling mechanism 200 in the unfolded state. As noted above, in this state, the shifter cable 202 and gear cable are coupled together for mutual movement. As shown in FIG. 5, the shifter pawl 244 of the shifter pulley 230 is engaged in the shifter detent 272 of the gear pulley 260. The retention pawl 304 of the stationary plate 290 is not engaged in the retention detent 270 of the gear pulley 260. Instead, the retention pawl 304 is supported (or "follows") in a disengaged position on the outer or base periphery of the gear pulley 260. In one exemplary embodiment, the retention pawl 304 in this position may also be supported by the cam surface 510 of the shifter pulley 230. In any event, the retention pawl 304 is maintained in the disengaged position when the bicycle 100 is in the unfolded state. Reference is briefly made to FIG. 8 that depicts a closer view of the shifter pawl 244 of the shifter pulley 230 engaged in the shifter detent 272 of the gear pulley 260. Additional reference is made to FIG. 9 that depicts a different view of the shifter pulley 230, gear pulley 260, and stationary plate 290 removed from the other elements of the cable decoupling mechanism 200 for clarity. FIG. 9 depicts the cable decoupling mechanism 200 in the same position as FIGS. 5 and 8.

In this configuration, when the shifter cable 202 is actuated (e.g., by adjusting the shifters 184) or otherwise moved, the shifter cable 202 pivots the shifter pulley 230, which as a result of the shifter pawl 244, also pivots the gear pulley 260, thereby actuating the shifter cable 202. As such, during operation, the shifter pulley 230 and gear pulley 260 pivot together as the operator changes gears by applying tension to the shifter cable 202 and pivoting the pulleys 230, 260 in the first rotational direction 590 or by releasing tension to the shifter cable 202, thereby enabling tension on the gear cable 204 from the spring assembly 173 of the rear hub assembly 160 to pull the pulleys 230, 260 in the second rotational direction 592. In one example, the rear hub assembly 160 may have five gears that are represented as different angular positions of the pulleys 230, 260. The view of FIG. 5 depicts the fifth gear in this example, while the first through fourth gears would correspond to angular adjustments in the first rotational direction 590.

FIG. 6 is a view of the components of the cable decoupling mechanism 200 in a transition state. This state may follow, for example, the configuration of FIG. 5 as the bicycle 100 is being transitioned into the folded state. In particular, as the bicycle 100 is being folded, the effective distance between the shifter cable 202 and the shifter 184 may be increased, thereby pulling the shifter cable 202. As the shifter cable 202 is tensioned, the shifter pulley 230 pivots in the direction of the shifter cable 202 (e.g., in the first rotational direction 590) into an angular position such as that depicted in FIG. 6.

At the angular position depicted in FIG. 6, the shifter pawl 244 contacts the transition surface 562 and subsequently the cam surface 560 of the stationary plate 290, which functions to lift the shifter pawl 244 out of the shifter detent 272 of the gear pulley 260 into the disengaged position. FIG. 7 depicts the shifter pawl 244 in the disengaged position relative to the gear pulley 260. In this position, the shifter pulley 230 and gear pulley 260 are no longer mechanically coupled together for mutual movement, thereby resulting in the decoupling of the shifter cable 202 and gear cable 204.

Figure 10:
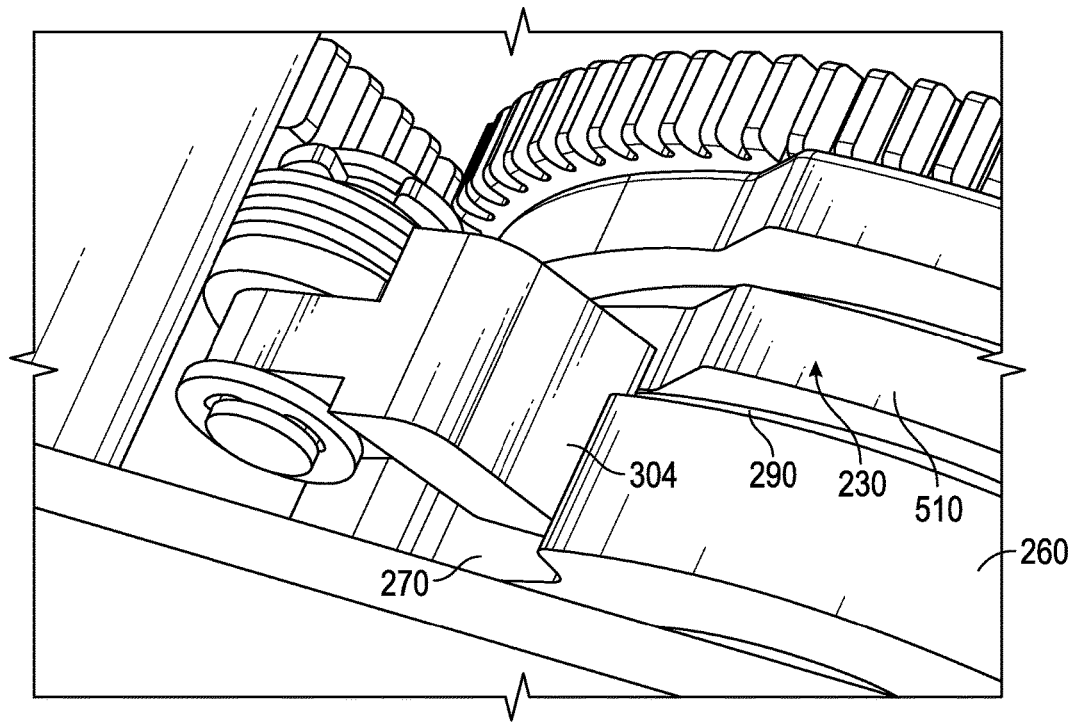
FIG. 10 is a further partial, more detailed top view of the cable decoupling mechanism of FIG. 3 in the folded state in accordance with an exemplary embodiment.
Figure 11:
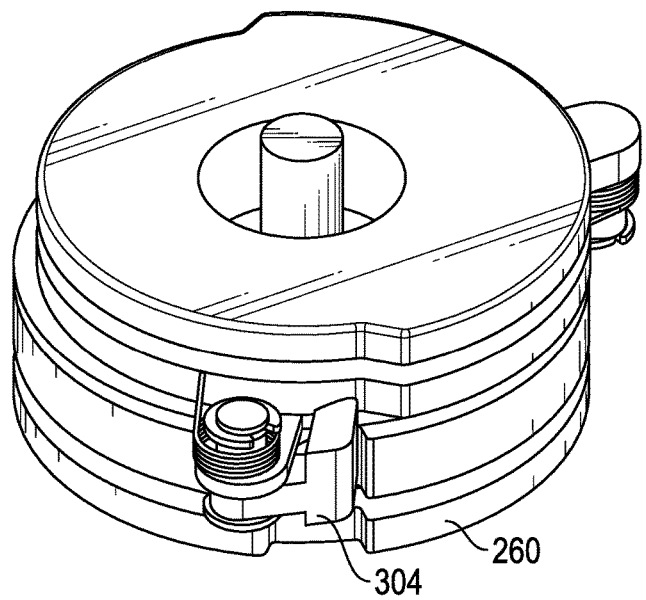
FIG. 11 is a partial, isometric view of the cable decoupling mechanism of FIG. 3 in the folded state in accordance with an exemplary embodiment.

Referring again to FIG. 6, the shifter pulley 230 and gear pulley 260 have advanced to an angular position such that the retention pawl 304 is biased into engagement with the retention detent 270. In other words, at this angular position, the retention pawl 304 is no longer following the cam surface 510 of the shifter pulley 230 because the cam surface 510 of the shifter pulley 230 has ended or otherwise transitioned to the base surface 500 of the shifter pulley 230, and further, the gear pulley 260 has advanced to a position in which the retention detent 270 is proximate to the retention pawl 304, such that the retention pawl 304 is biased by the retention pawl spring element 308 into the retention detent 270. In this position, the gear pulley 260 is "retained" or is held generally stationary by the stationary plate 290 via the retention pawl 304, particularly in the first rotational direction 590. Reference is briefly made to FIG. 10, which is a closer view of the retention pawl 304 of the stationary plate 290 engaging the retention detent 270 of the gear pulley 260.

In this state, the shifter pulley 230 may continue to pivot as the bicycle 100 is being folded, while the gear pulley 260 is retained. The shifter pulley 230 is free to rotate with changing tension on the shifter cable 202. As introduced above, the shifter pulley 230 is coupled to the tension spring 340 via the first and second gearwheels 310, 320. Movement of the shifter pulley 230 in the first rotational direction 590 results in increased tension in the tension spring 340 in an opposing direction 592, although the retention pawl 304 prevents movement of the shifter pulley 230 in this direction 592.

FIG. 7 is a view of the components of the cable decoupling mechanism 200 in a folded state. As a comparison of FIG. 7 with FIG. 6, the shifter pulley 230 has continued to pivot as a result of the pulling of the shifter cable 202 as the bicycle 100 is folded, while the gear pulley 260 is stationary. In effect, in FIGS. 6 and 7, the gear pulley 260 has been pulled past the first gear position until the shifter pawl 244 disengages and the retention pawl 304 retains the shifter pulley 260. Additional reference is made to FIG. 10 that depicts a different view of the shifter pulley 230, gear pulley 260, and stationary plate 290 removed from the other elements of the cable decoupling mechanism 200 for clarity. FIG. 10 depicts the cable decoupling mechanism 200 in the same position as FIG. 7 in which the bicycle 100 is in the folded state.

As noted above, the rear hub assembly 160 may have a neutral gear. In one example, the neutral gear of the rear hub assembly 160 corresponds to the position of the gear pulley 260 in FIGS. 7 and 10 (as well as FIGS. 6 and 9). In other words, the position of the gear pulley 260 pulls the cable assembly 188 such that the cable assembly 188 pulls the adjustment mechanism 171 into the neutral gear.

As the bicycle 100 is unfolded from the folded state, the cable decoupling mechanism 200 generally operates as described above, albeit in reverse. In particular, starting with FIG. 7, as the bicycle 100 is unfolded from the folded state, the shifter cable 202 may be effectively "shortened" to release the tension on the shifter cable 202, and thus, the shifter pulley 230. At this point, the opposing tension from the tension spring 340 on the shifter pulley 230 is released to pivot the shifter pulley 230 in second rotational direction 592.

For example, the shifter pulley 230 is pivoted from the angular position of FIG. 7 into approximately the angular position of FIG. 6. Prior to angular position of FIG. 6 relative to FIG. 7, the shifter pawl 244 on the shifter pulley 230 is generally following the base surface 570 of the outer periphery of the gear pulley 260 and the cam surface 560 of the stationary plate 290. At the angular position of FIG. 6, the cam surface 560 of the stationary plate 290 has ended and the shifter pawl 244 has pivoted to a position proximate to the shifter detent 272 such that the shifter pawl 244 is biased by the shifter pawl spring element 248 into engagement with the shifter detent 272. This re-couples the shifter pulley 230 and gear pulley 260.

As the shifter pulley 230 pivots from the angular position depicted in FIG. 6, the transition surface 512 and cam surface 510 of the shifter pulley 230 functions to lift the retention pawl 304 out of the retention detent 270 of the gear pulley 260. This releases the gear pulley 260 to rotate with the shifter pulley 230.

The shifter pulley 230 is pivoted back into the original position (e.g., to the selected gear of the shifter 184) as a result of tension from the tension spring 340. The gear pulley 260 may be pulled back into the original position as a result of tension from the rear hub assembly 160. As the bicycle 100 is unfolded into the unfolded state, the shifter pulley 230 and gear pulley 260 return to the original positions depicted in FIG. 5 in which the shifter pulley 230 and gear pulley 260 are engaged and mechanically coupled for mutual movement. As a result, the shifter cable 202 and gear cable 204 are again coupled together for normal operation.

Accordingly, the systems and methods described above provide a mechanism for decoupling a shifter cable from a gear cable. This provides improved foldable bicycles in which internally routed cables enable precise shifting when the bicycle is ridden and allow the bicycle to be folded into a compact package without causing cable damage or shift quality issues. In a decoupled state, the shifter cable is lightly tensioned by a spring while the gear cable is safely locked in fixed position. In some embodiments, all power and control result from tension and release of tension of the shifter cable and no active control is necessary, and the exemplary embodiments enable the bicycle to automatically engage a neutral gear during initial stages of the folding procedure. As such, in the folded state of the bicycle, the cable decoupling mechanism may position gears of the rear hub assembly into the neutral gear to enable the bicycle to be wheeled without driving the crank arms and pedals.

For the sake of brevity, conventional techniques and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Thus, although the schematic shown in FIGS. 1-9 depicts exemplary arrangements of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A cable decoupling mechanism for a bicycle having an unfolded state and a folded state, the cable decoupling mechanism comprising:
 a housing;
 a shifter pulley arranged at least partially within the housing and configured to receive a shifter cable coupled to a shifter of the bicycle; and
 a gear pulley arranged at least partially within the housing and configured to receive a gear cable coupled to a gear mechanism of the bicycle,
 wherein the shifter pulley and the gear pulley are mechanically engaged together in the unfolded state such that the shifter cable is mechanically coupled with the gear cable for mutual actuation, and
 wherein the shifter pulley and the gear pulley are mechanically disengaged from one another in the folded state such that the shifter cable and the gear cable are mechanically decoupled for independent movement.

2. The cable decoupling mechanism of claim 1,
 wherein the gear pulley has an outer periphery with a first detent,
 wherein the shifter pulley comprises a shifter pawl mounted on a pawl flange, the shifter pawl being pivotable between a first engaged position and a first disengaged position,
 wherein, in the unfolded state, the shifter pawl is in the first engaged position within the first detent to interlock the shifter pulley and the gear pulley, and
 wherein, in the folded state, the shifter pawl is in the first disengaged position outside of the first detent such that the shifter pulley is rotatable independently from the gear pulley.

3. The cable decoupling mechanism of claim 2,
wherein the outer periphery of the gear pulley has a second detent,
wherein the cable decoupling mechanism further comprises a retention pawl being pivotable between a second engaged position and a second disengaged position,
wherein, in the folded state, the retention pawl is in the second engaged position within the second detent to prevent rotation of the gear pulley in at least a first rotational direction, and
wherein, in the unfolded state, the retention pawl is in the second disengaged position outside of the second detent to enable rotation of the gear pulley.

4. The cable decoupling mechanism of claim 3,
further comprising a stationary plate arranged in between the shifter pulley and the gear pulley, the stationary plate comprising a flange supporting the retention pawl.

5. The cable decoupling mechanism of claim 4,
wherein the stationary plate includes a first cam surface that is configured to place the shifter pawl from the first engaged position into the first disengaged position as the shifter pulley rotates in the first rotational direction.

6. The cable decoupling mechanism of claim 5,
wherein the stationary plate includes a first base surface that is configured to place the shifter pawl from the first disengaged position into the first engaged position as the shifter pulley rotates in a second rotational direction.

7. The cable decoupling mechanism of claim 6,
wherein the shifter pulley includes a second cam surface and a second base surface, and
wherein the retention pawl is configured to follow the second cam surface in the second disengaged position and to follow the second base surface in the second engaged position such that rotation of the shifter pulley is configured to adjust the retention pawl between the second engaged position and the second disengaged position.

8. The cable decoupling mechanism of claim 3,
further comprising a tension assembly coupled to the shifter pulley to bias the shifter pulley in a second rotational direction.

9. The cable decoupling mechanism of claim 8,
wherein the tension assembly includes a first gearwheel rotationally coupled to the shifter pulley, a second gearwheel rotationally coupled to the first gearwheel, and a tension spring rotationally coupled to the second gearwheel such that tension of the shifter cable drives the shifter pulley in the first rotational direction, the first gearwheel in the first rotational direction, the second gearwheel in the second rotational direction, and the tension spring in the second rotational direction.

10. The cable decoupling mechanism of claim 1,
further comprising a stationary plate arranged in between the shifter pulley and the gear pulley, the stationary plate comprising a retention pawl being pivotable between a retention pawl engaged position and a retention pawl disengaged position, the stationary plate further comprising a stationary plate outer periphery defined by at least a stationary plate cam surface and a stationary plate base surface,
wherein the gear pulley has a gear pulley outer periphery defined by at least a first detent, a second detent, and a gear pulley base surface,
wherein the shifter pulley comprises a shifter pawl mounted on a pawl flange, the shifter pawl being pivotable between a shifter pawl engaged position and a shifter pawl disengaged position, and wherein the shifter pulley comprises a shifter pulley outer periphery defined by at least a shifter pulley cam surface and a shifter pulley base surface,
wherein, in the unfolded state, the shifter pawl is in the shifter pawl engaged position within the second detent of the gear pulley at an angular position proximate to the stationary plate base surface, and wherein, in the unfolded state, the retention pawl is in the shifter pawl disengaged position outside of the first detent of the gear pulley at an angular position proximate to the shifter pulley cam surface, and
wherein, in a first transition from the unfolded state to the folded state, a first tension force on the shifter cable pulls the shifter pulley and the gear pulley in a first rotational direction relative to the stationary plate until the shifter pawl encounters the stationary plate cam surface to place the shifter pawl into the shifter pawl disengaged position, thereby decoupling the shifter pulley from the gear pulley, and the retention pawl encounters the shifter pulley base surface to place the retention pawl into the retention pawl engaged position, thereby retaining the gear pulley.

11. The cable decoupling mechanism of claim 10,
wherein, in the folded state, the shifter pawl is in the shifter pawl disengaged position outside of the second detent of the gear pulley at an angular position proximate to the stationary plate cam surface, and wherein, in the folded state, the retention pawl is in the shifter pawl engaged position within of the first detent of the gear pulley at an angular position proximate to the shifter pulley base surface, and
wherein, in a second transition from the folded state to the unfolded state, a release of the first tension force on the shifter cable enables a tension assembly to pull the shifter pulley in a second rotational direction relative to the stationary plate until the shifter pawl encounters the stationary plate base surface to place the shifter pawl into the shifter pawl engaged position, thereby coupling the shifter pulley and the gear pulley, and the retention pawl encounters the shifter pulley cam surface to place the retention pawl into the retention pawl disengaged position, thereby releasing the gear pulley.

12. A bicycle, comprising:
a foldable frame having a folded state and an unfolded state, wherein the foldable frame includes at least one hollow portion;
at least a front wheel and a back wheel coupled to the foldable frame;
a gear assembly coupled to the back wheel;
a shifter configured to receive an input associated with the gear assembly;
a cable decoupling mechanism positioned within the at least one hollow portion of the foldable frame; and
a cable assembly extending through the at least one hollow portion of the foldable frame and between the shifter and the gear assembly, the cable assembly comprising an input cable extending between the input device and the cable decoupling mechanism and a gear cable extending between the cable decoupling mechanism and the gear assembly,
wherein the cable decoupling mechanism is configured to couple the shifter cable and the gear cable together in the unfolded state and to decouple the shifter cable and the gear cable from one another in the folded state.

13. The bicycle of claim 12, wherein the cable decoupling mechanism comprises:
a housing;
a shifter pulley arranged at least partially within the housing and configured to receive the shifter cable; and
a gear pulley arranged at least partially within the housing and configured to receive the gear cable,
wherein the shifter pulley and the gear pulley are mechanically engaged together in the unfolded state such that the shifter cable is coupled with the gear cable for mutual actuation, and
wherein the shifter pulley and the gear pulley are mechanically disengaged from one another in the folded state such that the shifter cable and the gear cable are decoupled for independent movement.

14. The bicycle of claim 13,
wherein the gear pulley has an outer periphery with a first detent,
wherein the shifter pulley comprises a shifter pawl mounted on a pawl flange, the shifter pawl being pivotable between a first engaged position and a first disengaged position,
wherein, in the unfolded state, the shifter pawl is in the first engaged position within the first detent to interlock the shifter pulley and the gear pulley, and
wherein, in the folded state, the shifter pawl is in the first disengaged position outside of the first detent such that the shifter pulley is rotatable independently from the gear pulley.

15. The bicycle of claim 14,
wherein the outer periphery of the gear pulley has a second detent,
wherein the cable decoupling mechanism further comprises a retention pawl being pivotable between a second engaged position and a second disengaged position,
wherein, in the folded state, the retention pawl is in the second engaged position within the second detent to prevent rotation of the gear pulley in at least a first rotational direction, and
wherein, in the unfolded state, the retention pawl is in the second disengaged position outside of the second detent to enable rotation of the gear pulley.

16. The bicycle of claim 15, wherein the cable decoupling mechanism further comprises a stationary plate arranged in between the shifter pulley and the gear pulley, the stationary plate comprising a flange supporting the retention pawl.

17. The bicycle of claim 16, wherein the stationary plate includes a first cam surface that is configured to place the shifter pawl from the first engaged position into the first disengaged position as the shifter pulley rotates in the first rotational direction.

18. The bicycle of claim 17, wherein the stationary plate includes a first base surface that is configured to place the shifter pawl from the first disengaged position into the first engaged position as the shifter pulley rotates in a second rotational direction.

19. The bicycle of claim 18,
wherein the shifter pulley includes a second cam surface and a second base surface, and
wherein the retention pawl is configured to follow the second cam surface in the second disengaged position and to follow the second base surface in the second engaged position such that rotation of the shifter pulley is configured to adjust the retention pawl between the second engaged position and the second disengaged position.

20. The bicycle of claim 19, wherein the cable decoupling mechanism further comprises a tension assembly coupled to the shifter pulley to bias the shifter pulley in the second rotational direction, and
wherein the tension assembly includes a first gearwheel rotationally coupled to the shifter pulley, a second gearwheel rotationally coupled to the first gearwheel, and a tension spring rotationally coupled to the second gearwheel such that tension of the shifter cable drives the shifter pulley in the first rotational direction, the first gearwheel in the first rotational direction, the second gearwheel in the second rotational direction, and the tension spring in the second rotational direction.

* * * * *